United States Patent [19]
Kaylo et al.

[11] Patent Number: 6,093,298
[45] Date of Patent: Jul. 25, 2000

[54] ELECTROCOATING COMPOSITIONS CONTAINING HIGH ASPECT RATIO CLAYS AS CRATER CONTROL AGENTS

[75] Inventors: Alan J. Kaylo, Glenshaw; Richard F. Karabin, Ruffs Dale, both of Pa.; Tie Lan, Lake Zurich, Ill.; Michael G. Sandala, Pittsburgh, Pa.

[73] Assignee: PPG Industries Ohio, Inc., Cleveland, Ohio

[21] Appl. No.: 09/255,206

[22] Filed: Feb. 22, 1999

[51] Int. Cl.$^7$ ..................................................... C25D 13/10
[52] U.S. Cl. .......................... 204/489; 204/506; 524/415; 524/445
[58] Field of Search ..................... 204/489, 506; 524/415, 445

[56] References Cited

U.S. PATENT DOCUMENTS

| | | | |
|---|---|---|---|
| 4,379,007 | 4/1983 | Fifer et al. | 149/22 |
| 4,472,538 | 9/1984 | Kamigaito et al. | 523/202 |
| 4,739,007 | 4/1988 | Okada et al. | 524/789 |
| 4,800,041 | 1/1989 | Tymon et al. | 252/378 R |
| 4,889,885 | 12/1989 | Usuki et al. | 524/445 |
| 4,894,411 | 1/1990 | Okada et al. | 524/710 |
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,206,284 | 4/1993 | Fukui et al. | 524/504 |
| 5,391,437 | 2/1995 | Miyasaka et al. | 524/425 |
| 5,428,094 | 6/1995 | Tokoh et al. | 524/379 |
| 5,552,469 | 9/1996 | Beall et al. | 524/445 |
| 5,554,670 | 9/1996 | Giannelis et al. | 523/209 |
| 5,578,672 | 11/1996 | Beall et al. | 524/446 |
| 5,698,624 | 12/1997 | Beall et al. | 524/445 |
| 5,721,306 | 2/1998 | Tsipursky et al. | 524/449 |
| 5,760,121 | 6/1998 | Beall et al. | 524/450 |
| 5,786,417 | 7/1998 | Ogawa et al. | 524/446 |
| 5,804,613 | 9/1998 | Beall et al. | 524/442 |
| 5,853,886 | 12/1998 | Pinnavaia et al. | 523/209 |

OTHER PUBLICATIONS

Arimitsu Usuki et al., "Syntheis of nylon 6–clay hybrid", *J. Mater. Res*, vol. 8, No. 5 (May 1993).

*Primary Examiner*—Kishor Mayekar
*Attorney, Agent, or Firm*—William J. Uhl

[57] ABSTRACT

Provided are cationic electrodepositable compositions comprised of an acidified aqueous dispersion of (a) an ungelled cationic resin, (b) a curing agent having at least two functional groups which are reactive with (a), and (c) an exfoliated silicate derived from a layered silicate. These compositions exhibit improved crater control. Also provided is a method of electrocoating conductive substrates using such compositions.

25 Claims, No Drawings

ELECTROCOATING COMPOSITIONS CONTAINING HIGH ASPECT RATIO CLAYS AS CRATER CONTROL AGENTS

FIELD OF THE INVENTION

The present invention relates to cationic electrodepositable coating compositions containing a cationic resin, a curing agent and an exfoliated silicate material. The invention also relates to a method of electrocoating conductive substrates using compositions which contain the exfoliated silicate materials.

BACKGROUND OF THE INVENTION

Electrodeposition as a coating application method involves deposition of a film-forming composition onto a conductive substrate under the influence of an applied electrical potential. Electrodeposition has become increasingly important in the coatings industry because, by comparison with non-electrophoretic coating means, electrodeposition offers increased paint utilization, improved corrosion protection and low environmental contamination.

Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

Although surface coatings of excellent quality can be achieved by means of cationic electrodeposition, a problem associated with this means of coating is the development of surface defects upon curing, particularly craters. The cause of such defects can be a result of the very nature of the electrocoating, composition components, that is, causes inherent in the system. Typically, however, impurities which are carried into the electrocoating bath with the workpiece cause such surface defects. Examples of such impurities include lubricating oil, anti-corrosion grease, joint sealing compound and the like.

As the electrocoating composition is deposited onto the conductive substrate, the impurities are carried along with the coating composition and are deposited as well. When the coated substrate is cured, craters are formed due to the incompatibility between the impurity and the resinous phase of the electrocoating composition.

Due to their low cost and commercial availability, the use of minerals as rheology modifiers and/or fillers in coating compositions is common. Traditionally these have included such minerals as wollastonite, attapulgite, kaolin, talc, mica and calcium carbonate. These materials have been incorporated in both treated and untreated forms, the most common treatment being silanization, to compatibilize the mineral hydrophilic surface with the host polymer. Minerals such as mica and talc, which are layered silicate materials, have a platy morphology with aspect ratios (aspect ratio=ratio of particle width to particle thickness) of typically less than 50. These materials are commonly known for use in coatings as rheology modifiers and fillers and, in addition, due to parallel interlamination of the silicate layers, can improve barrier properties.

To effectuate adequate crater control in electrocoating compositions using these common clay minerals, a high level is needed, e.g., 2 to 20 percent by weight based on total solids of the electrodeposition bath. At these levels other liquid coating properties, for example, working viscosity and stability, and cured coating properties, such as appearance, can be adversely affected. Also, clays generally known for use in coatings are typically not desirable for use in electrocoating compositions because ionic contaminants contained within these materials tend to destabilize the electrodeposition baths and cause settling.

Also known in the art is the preparation of aqueous dispersions of exfoliated layered materials, such as vermiculite and bentonite clays. Generally, the clay particles are contacted with an ionic solution to effect cation exchange within the interlayer spacing, thereby permitting swelling of the spacing to ultimately bring about delamination ("exfoliation") upon immersion in aqueous media. These ionic solutions typically contain lithium, alkyl ammonium and/or ammonium carboxylic acid cations. The exfoliated particles are then dispersed under high shear. These dispersions can be used to form or cast films by using drawdown or spraying techniques followed by evaporation of the aqueous phase.

Additionally, it is known to use smectite minerals, particularly montmorillonite clays, in plastic composite materials. These materials are a family of clays having a 2:1 layer structure and, typically, aspect ratios ranging from about 200 to 2,000, which are orders of magnitude greater than for conventional fillers such as mica and talc. The clays are treated with polymers which contain functional groups, e.g., hydroxyl, amine, and amide groups, to enlarge the interlayer spacing such that insertion and ionic attachment of organic molecules to the platelet surfaces can occur (a process known as "intercalation" with the product formed thereby being known as an "intercalate"). During a subsequent polymerization/compounding step in composite formation, individual platelets delaminate or "exfoliate" and are embedded throughout the polymer matrix.

Such polymer-clay composites are described in U.S. Pat. No. 5,853,886 wherein a proton-exchanged layered silicate is intercalated with a basic group-containing polymerizing component. The intercalate is then contacted with a thermoset or a thermoplastic resin system which reacts with the polymerizing component thereby exfoliating the intercalate and forming a hybrid polymer-clay composite.

Although the prior art discloses dispersions of layered silicate materials in aqueous media, as well as the use of such dispersions to form films of exfoliated layered silicate materials, the prior art does not disclose the use of such dispersions in coating compositions, particularly electrocoating compositions.

Moreover, although the art teaches the intercalation of layered silicate materials with a polymer containing functional groups, with subsequent exfoliation in the presence of a host polymer to form platelet/polymer composite materials, there is no teaching in the prior art of the use of silicate materials derived from layered silicate materials which are exfoliated with a cationic group-containing polymer or a polymer which contains functional groups which can be post-reacted to form cationic groups, in coating compositions, particularly in electrodepositable coating compositions.

It has been found that the inclusion in electrocoating compositions of silicate materials derived from layered silicates, such as montmorillonite clays, which have been exfoliated with a cationic group-containing polymer or a polymer containing functional groups which can be post-reacted to form cationic groups, provides improved crater resistance. Moreover, it has been found that these silicate materials effectuate improved crater resistance at levels much lower than those levels needed for more conventional clay materials and, therefore, liquid coating properties, such as electrodeposition bath stability and working viscosity, and cured coating properties, such as adhesion and appearance are not adversely affected.

SUMMARY OF THE INVENTION

In accordance with the present invention, an electrodepositable composition is provided which is comprised of an acidified aqueous dispersion of the following components:

(a) an ungelled cationic resin;

(b) a curing agent having at least two functional groups which are reactive with (a); and (c) an exfoliated silicate.

Additionally, a method for electrocoating a conductive substrate serving as a cathode with the above-described composition is provided.

The compositions which contain the exfoliated silicate exhibit improved resistance to the formation of surface defects, such as craters, without adversely affecting working viscosity and stability, and coating appearance and/or adhesion of subsequently applied primers and/or topcoats.

Other than in the operating examples, or where otherwise indicated, all numbers expressing quantities of ingredients or reaction conditions used in the specification and claims are to be understood as modified in all instances by the term "about". As used herein, in the specification and the claims, the term "polymer" is meant to include oligomers.

DETAILED DESCRIPTION OF THE INVENTION

Layered silicate materials suitable for use in the present invention include any clay mineral having a platy morphology which is characterized by a layered lattice structure in which the silicate layer units have a thickness of up to 25 Å, preferably 5 to 15 Å, more preferably 5 to 10 Å, and an interlayer spacing capable of expanding at least 5 Å. Usually, the layers are separated by exchangeable cations associated with water molecules. Useful layered silicates include, but are not limited to, phyllosilicates, such as smectite clay minerals, for example montmorillonite, particularly sodium montmorillonite, calcium montmorillonite and/or magnesium montmorillonite; nontronite; biedellite; volkonskoite; hectorite; saponite; sauconite; sobockite; stevensite; svinfordite; vermiculite and the like. Other useful layered materials include micaceous minerals such as illite and mixed layered illite/smectite minerals.

Preferably, the layered silicates employed in the electrodepositable coating compositions of the invention have a cation exchange capacity (a measure of charge density on the surface of the clay particle) of 30 to 200 milliequivalents of cation per 100 grams of layered silicate.

Preferred layered silicate materials are phyllosilicates of the 2:1 type having a negative charge on the layers and a commensurate number of exchangeable cations in the interlayer spaces. More preferably, the layered silicate materials are smectite clay minerals such as montmorillonite; nontronite; biedellite; volkonskoite; hectorite; saponite; sauconite; sobockite; stevensite; and svinfordite. The most preferred of these being montmorillonite materials which contain within the interlayer spacing exchangeable cations, preferably $Ca^{+2}$ and $Na^+$, which are associated with water molecules.

As used herein, the term "interlayer spacing" refers to the space between the internal faces of the adjacent layers as they are naturally assembled in the layered material before exfoliation of the individual layers. It should be noted that in this state, these materials do not readily exfoliate, regardless of the degree of shear applied, because the interlayer cohesive forces are relatively strong.

By the term "intercalate" or "intercalation" is meant to form a discrete complex between a layered silicate and an organic molecule (including polymers) that exhibits a definite interlayer spacing which can be characterized by x-ray diffraction techniques. By the term "exfoliate" or "exfoliation" is meant to delaminate individual platelets of an intercalated layered material, i.e., the delamination of individual platelets is essentially complete. The separation between individual layers in an exfoliate is such that no coherent x-ray diffraction occurs.

These preferred layered silicate materials typically have aspect ratios of at least 200, preferably at least 500. Also, the layered silicate materials typically have aspect ratios less than 2,000. The aspect ratios of the layered silicate materials may range between any combination of these values, inclusive of the recited values.

As aforementioned, the silicate layered material is exfoliated with a cationic group-containing polymer or a polymer which contains functional groups, such as amino groups or epoxy groups, which can be post-reacted to form cationic groups. Preferably, the silicate layered material is exfoliated with an amino group-containing polymer. Suitable cationic group-containing polymers include those which contain amine salt groups and onium salt groups, for example, sulfonium salt groups and phosphonium salt groups.

Amino group containing polymers can be prepared by reacting a polyepoxide polymer or an epoxy group-containing acrylic polymer with a primary and/or secondary amine to introduce amine functionality.

The polyepoxides suitable for use in the practice of the present invention may be saturated or unsaturated, cyclic or acyclic, aliphatic, alicyclic, aromatic or heterocyclic as are known to those skilled in the art. Also, the polyepoxides may contain substituents such as halogen, hydroxyl, and ether groups. Examples of polyepoxides are those polymers having a 1,2-epoxy equivalency greater than one and preferably about two, that is, polyepoxides which have on an average basis two epoxy groups per molecule as are well known in the art. Preferred polyepoxides are polyglycidyl ethers of cyclic polyols. Particularly preferred are polyglycidyl ethers of polyhydric phenols such as Bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis(4-hydroxyphenyl)propane, 1,1-bis(4-hydroxyphenyl)ethane, 2-methyl-1,1-bis(4-hydroxyphenyl)propane, 2,2-bis(4-hydroxy-3-t-butylphenyl)propane, bis-(2-hydroxynaphthyl) methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols would be alicyclic polyols, particularly cycloaliphatic polyols, such as 1,2-cyclohexanediol; 1,4-cyclohexanediol; 1,2-bis (hydroxymethyl)cyclohexane; 1,3-bis(hydroxymethyl) cyclohexane; and hydrogenated Bisphenol A.

Further examples of the polyepoxide polymers generally are shown in U.S. Pat. Nos. 4,711,917 (columns 5–8); 4,031,050 (columns 3–5); and 3,922,253 (columns 1–2).

The epoxide equivalent weight of the polyepoxide will generally range from 100 to about 2000 and preferably from about 180 to 500. Epoxy group-containing acrylic polymers such as those described in U.S. Pat. No. 4,001,156 (columns 3–6) can also be used.

Chain-extended polyepoxide polymers may also be used and are preferred. Generally, chain extension can be carried out by reacting together a polyepoxide and a polyhydroxyl group-containing material selected from alcoholic hydroxyl group-containing materials and phenolic hydroxyl group-containing materials to chain extend or build the molecular weight of the polyepoxide.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used.

Also, the chain extension of the polyepoxides optionally can be with a polycarboxylic acid material, preferably a dicarboxylic acid. Useful dicarboxylic acids include acids having the general formula: HOOC—R—COOH, where R is a divalent moiety that is substantially unreactive with the polyepoxide. R can be a straight chained or a branched alkylene or alkylidene moiety normally containing from 2 to 42 carbon atoms. Some examples of suitable dicarboxylic acids include adipic acid, 3,3-dimethylpentanedioic acid, benzenedicarboxylic acid, phenylenediethanoic acid, naphthalenedicarboxylic acid, pimelic acid, suberic acid, azelaic acid, sebacic acid and the like. Additional suitable dicarboxylic acids include substantially saturated acyclic, aliphatic dimer acids formed by the dimerization reaction of fatty acids having from 4 to 22 carbon atoms and a terminal carboxyl group (forming dimer acids having from 8 to 44 carbon atoms). Dimer acids are well known in the art. An example of such a diacid is the so-called "dimer acids" and "trimer acids" sold under the name EMPOL® by the Henkel Corporation, Emery Group, Cincinnati, Ohio.

The acrylic polymers are copolymers of one or more epoxy group-containing, ethylenically unsaturated monomers, and one or more alkyl esters of acrylic acid or methacrylic acid optionally together with one or more other polymerizable ethylenically unsaturated monomers. These polymers may be either of the thermoplastic type or the thermosetting crosslinking type.

Suitable epoxy group-containing, ethylenically unsaturated monomers are those containing 1,2-epoxy groups and include glycidyl acrylate, glycidyl methacrylate and allyl glycidyl ether.

Suitable alkyl esters of acrylic acid or methacrylic acid include methyl methacrylate, ethyl methacrylate, butyl methacrylate, ethyl acrylate, butyl acrylate, and 2-ethyl hexyl acrylate.

Suitable other copolymerizable ethylenically unsaturated monomers include vinyl aromatic compounds such as styrene and vinyl toluene; nitrites such acrylonitrile and methacrylonitrile; vinyl and vinylidene halides such as vinyl chloride and vinylidene fluoride and vinyl esters such as vinyl acetate. Also, suitable hydroxyl group-containing, ethylenically unsaturated monomers may be used to include hydroxyethyl acrylate, hydroxyethyl methacrylate, hydroxypropyl acrylate, and hydroxypropyl methacrylate. Also allyl alcohol or oxyalkylated monomers such as oxyalkylated acrylic and methacrylic acid may be used. Additionally, hydroxy monomers chain extended with caprolactone may also be used As previously set forth, the epoxy-containing materials are reacted with a primary and/or secondary amine, preferably a secondary amine, to form an adduct. Examples of suitable amines include mono- and dialkylamines such as methylamine, ethylamine, propylamine, butylamine, dimethylamine, diethylamine, dipropylamine, dibutylamine, methylbutylamine, benzyldimethylamine and the like.

The amount of amine reacted with the epoxy group-containing material is at least that amount sufficient to render the polymer ionic in character when acid-solubilized. In some instances essentially all of the epoxy groups of the polymer are reacted with amine. However, excess epoxy groups may remain which hydrolyze upon contact with water to form hydroxyl groups.

Alternatively, the amino group-containing polymer can be an acrylic copolymer of one or more ethylenically unsaturated, radically polymerizable monomers and at least one secondary nitrogen-containing aminoalkyl monomers having from 1 to 6 carbon atoms in the alkyl group such as dimethylaminoethyl (meth)acrylate, and/or tertiary nitrogen-containing aminoalkyl monomers having from 1 to 6 carbon atoms in the alkyl group, such as tert-butylaminoethyl (meth)acrylate. Preferably, the amino group-containing polymer is the adduct of a primary and/or secondary amine with an polyepoxide resin.

After polymerization, the amine functionality of the polymer can be at least artially neutralized with acid to form cationic amine salt groups.

The layered silicate materials can also be exfoliated with polymers which contain onium salt groups or polymers which contain functional groups which can be converted to onium salt groups. The exfoliating polymer can be an epoxy functional group-containing polymer, which after exfoliation can be post-reacted with an amine acid salt to form a quaternary ammonium salt, or, alternatively, with a sulfide in the presence of an acid to form a ternary sulfonium salt. Examples of epoxy-functional polymers suitable for use as polymers of the present invention include those described above for amine salt group containing polymers.

Examples of amine acid salts suitable for use in preparing the onium salt group containing polymers which contain quaternary ammonium salt groups are those described in U.S. Pat. No. 3,975,346 at column 10, line 43 to column 13, line 12; and U.S. Pat. No. 3,962,165 at column 7, line 24 to column 9, line 53, both incorporated herein by reference. Examples of sulfides and acids suitable for use in preparing the active hydrogen group-containing polymers which contain ternary sulfonium salt groups are those described in U.S. Pat. No. 4,038,166 at column 13, line 57 to column 14, line 11, incorporated herein by reference.

The cationic group-containing polymer or polymer having functional groups which can be post-reacted to form cationic groups typically has a number average molecular weight (Mn) of at least 500, preferably at least 5000. The functional group-containing polymer also typically has a Mn of less than 100,000, preferably less than 50,000, and more preferably less than 30,000. The Mn of the polymer may range between any combination of these values, inclusive of recited values. Unless otherwise indicated, all molecular weights described in the specification and claims are determined by gel permeation chromatography using polystyrene standards.

Also, with reference to the cationic group-containing polymer or polymer having functional groups which can be post-reacted to form cationic groups, the polymer typically contains at least 5 milliequivalents of base/gram, preferably at least 1 milliequivalent of base/gram. The polymer also typically contains greater than 0.1 milliequivalent of base/gram, preferably greater than 0.2 milliequivalent of base/gram, and more preferably greater than 0.4 milliequivalent of base/gram. The milliequivalents of base per gram of the polymer may range between any combination of these values, inclusive of the recited values. As used herein, and in the claims, values for milliequivalents of base/gram of polymer are determined in accordance with ASTM D-4370.

As indicated above, exfoliation is the process by which the individual layers or platelets of the layered silicate material are sufficiently delaminated from the clay particle to effect uniform and stable dispersion of the silicate material in aqueous media. With reference to dispersion of the exfoliated silicate in aqueous medium, by "stable dispersion" is meant herein that the delaminated platelets remain uniformly suspended throughout the aqueous phase, thought to be by charge stabilization via the cationic groups of the exfoliating polymer. Upon standing at ambient conditions of temperature and pressure, the dispersions do not flocculate or form a hard sediment. If over time some sedimentation occurs, it can be easily redispersed with low shear stirring. As they exist in the natural state, the layered silicate materials do not readily exfoliate under shear. The interlayer spacing must first be increased, or intercalated, to disrupt the interlayer cohesive forces, at which time exfoliation may be accomplished, usually by applying agitation or shear.

Generally, in the compositions of the invention, the layered silicate material is treated with an acid or acid solution to exchange the interlayer cations, e.g., $Na^+$ and $Ca^{+2}$, for an acidic proton. Intercalation and exfoliation can then be accomplished by contacting the acidified layered silicate material with the cationic group-containing polymer or polymer having functional groups which can be converted to cationic groups under shear or agitation. As the polymer having functional groups which can be converted to cationic groups is introduced to increase the interlayer spacing, reaction with or neutralization of the functional groups of the polymer by the acid present in the interlayer spacing can occur, thereby forming cationic salt groups and/or anchoring the polymer to the platelet surfaces. With continued agitation or shear, exfoliation and dispersion are achieved. Agitation or shear may be accomplished by any means which is commonly known in the art, for example, colloidal mills, high speed blenders, homogenizers and the like. Efficient dispersion of the exfoliated layered silicate material in aqueous media is facilitated by the presence of the cationic salt groups.

More specifically, intercalation, exfoliation and dispersion of the layered silicate material can be accomplished in a number of ways. The polymer having functional groups which can be converted to cationic groups may be pretreated with an acid prior to the intercalation and exfoliation of the layered silicate material to provide cationic salt groups which act to anchor the polymer to the layer surfaces (to effect intercalation and exfoliation) and to subsequently facilitate dispersion into aqueous media. Alternatively, the layered silicate material can be pretreated with acid prior to intercalation and exfoliation with the polymer having functional groups which can be converted to cationic groups to exchange the interlayer cations for acidic protons, and to subsequently neutralize the functional groups of the polymer upon intercalation and exfoliation. Also, the layered silicate material can be pretreated with an acid prior to intercalation and exfoliation to exchange the interlayer cations for acidic protons. The clay particles are then contacted with the polymer and intercalation, exfoliation and dispersion are accomplished as, while under agitation, the intercalate is subjected to an additional acid treatment to neutralize the functional groups of the polymer, thereby forming cationic salt groups which facilitate dispersion in aqueous media. In the alternative, intercalation, exfoliation and dispersion of the layered silicate material can be effected by directly contacting the clay particles under shear with a cationic group containing polymer, for example, an amine salt group-containing polymer or a sulfonium salt group-containing polymer, in the presence of water.

Any acid which can effect formation of cationic groups may be used in the above-described process. Examples of acids suitable for use in the compositions of the invention include, but are not limited to, carboxylic acid, phosphorous containing acids, sulfur containing acids and the like. Preferred acids are those selected from the group consisting of sulfamic acid, lactic acid, acetic acid, oxalic acid and formic acid.

As aforementioned, the layered silicate materials which are exfoliated as described above, are employed in the compositions of the present invention which comprise an acidified aqueous dispersion of the following components:

(a) an ungelled cationic resin;
(b) a curing agent having at least two functional groups which are reactive with (a); and
(c) a silicate material derived from a layered silicate. Preferably, the layered silicate has been exfoliated with a cationic group-containing polymer or a polymer having functional groups which can be post-reacted to form cationic groups.

By "ungelled" is meant that the polymer is substantially free of crosslinking and has an intrinsic viscosity when dissolved in a suitable solvent. The intrinsic viscosity of a polymer is an indication of its molecular weight. A gelled polymer, on the other hand, since it is of essentially infinitely high molecular weight, will have an intrinsic viscosity too high to measure.

With reference to the cationic resin (a), a wide variety of cationic polymers are known and can be used in the compositions of the invention so long as the polymers are "water dispersible," i.e., adapted to be solubilized, dispersed or emulsified in water. The water dispersible resin is cationic in nature, that is, the polymer contains cationic functional groups to impart a positive charge. Preferably, the cationic resin (a) also contains active hydrogen groups.

Examples of cationic resins suitable for use in the compositions of the invention include amine salt group-containing resins such as the acid-solubilized reaction products of polyepoxides and primary or secondary amines such as those described in U.S. Pat. Nos. 3,663,389; 3,984,299; 3,947,338; and 3,947,339. Usually, theses amine salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as is described in U.S. Pat. No. 3,947,338. Also, one-component compositions as described in U.S. Pat. No. 4,134,866 and DE-OS No. 2,707,405 can be used as the cationic resin (a). Besides the epoxy-amine reaction products, resins can also be selected from cationic acrylic resins such as those described in U.S. Pat. Nos. 3,455,806 and 3,928,157.

Besides amine salt group-containing resins, quaternary ammonium salt group-containing resins can also be employed. Examples of these resins are those which are formed from reacting an organic polyepoxide with a tertiary amine salt. Such resins are described in U.S. Pat. Nos. 3,962,165; 3,975,346; and 4,001,101. Examples of other cationic resins are ternary sulfonium salt group-containing resins and quaternary phosphonium salt-group containing resins such as those described in U.S. Pat. Nos. 3,793,278 and 3,984,922, respectively. Also, cationic resins which cure via transesterification such as described in European Application No. 12463 can be used. Further, cationic compositions prepared from Mannich bases such as described in U.S. Pat. No. 4,134,932 can be used.

The resins to which the present invention is particularly effective are those positively charged resins which contain primary and/or secondary amine groups. Such resins are described in U.S. Pat. Nos. 3,663,389; 3,947,339; and 4,115,900. In U.S. Pat. No. 3,947,339 a polyketimine derivative of a polyamine such as diethylenetriamine or triethylenetetraamine and the excess polyamine vacuum stripped from the reaction mixture. Such products are described in U.S. Pat. Nos. 3,663,389 and 4,116,900.

The cationic resin (a) described immediately above is typically present in the compositions in amounts of 1 to 60 weight percent, preferably 5 to 25 weight percent based on total weight of the composition.

As previously indicated, the composition of the present invention further comprises a curing agent (b) which contains at least two functional groups which are reactive with the cationic resin (a). The preferred curing agents for use in the compositions of the invention are blocked organic polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30, which are incorporated by reference herein. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanate 0-prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the cationic resin in amounts from 1 weight percent to 65 weight percent, preferably from 5 weight percent to 45 weight percent, based on the total weight of the composition.

The solids content of component (c) in the composition is typically less than 50 weight percent, preferably less than 10 weight percent based on total solids content of the composition. Also, the solids content of component (c) in the composition is typically at least 1 weight percent, preferably at least 3 weight percent, and more preferably at least 5 weight percent based on total solids content of the composition. The solids content of component (c) in the composition may range between any combination of these values, inclusive of the recited values. Also, in the compositions of the invention, in component (c), the weight ratio of the layered silicate material to the cationic group containing polymer is 0.01 to 1:1, preferably from 0.05 to 0.5:1.

Also with reference to component (c), the polymer with which the layered silicate material is exfoliated, may be the same or different from the cationic resin (a), provided that the polymer of (c) is compatible with the cationic resin (a). By "compatible" is meant that the cationic group-containing polymer will neither gel the composition by too readily reacting with (a) and/or (b), nor adversely affect cure of the composition by hindering the curing reaction between (a) and (b). Additionally, the cationic resin (a) and the polymer (c) used to exfoliate the layered silicate should be physically compatible, that is, when blended together the two polymers form a clear homogeneous mixture or solution.

The electrodepositable compositions of the present invention are in the form of an aqueous dispersion. With reference to the electrodepositable compositions, the term "dispersion" as used herein is believed to be a transparent, translucent or opaque resinous system in which the resin is in the dispersed phase and water is in the continuous phase. The average particle size of the resinous phase is generally less than 1.0 and usually less than 0.5 microns, preferably less than 0.15 micron.

The concentration of the resinous phase in the aqueous medium is at least 1 and usually from about 2 to about 60 percent by weight based on total weight of the aqueous dispersion. When the compositions of the present invention are in the form of resin concentrates, they generally have a resin solids content of about 20 to about 60 percent by weight based on weight of the aqueous dispersion.

Electrodeposition coating compositions of the invention are typically supplied as two components: (1) a clear resin feed, which includes, generally, the cationic resin (a), i.e., the main film-forming polymer, the curing agent (b), and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition coating composition components (1) and (2) are dispersed in an aqueous medium which comprises water and, usually, coalescing solvents, to form an electrodeposition bath.

It should be appreciated that there are various methods by which the layered silicate material which has been exfoliated with a cationic group-containing polymer or polymer having functional groups which can be post-reacted to form cationic groups, component (c), can be incorporated into the electrodeposition bath. Component (c) can be added "neat," that is, added directly to the bath without prior blending or reacting with other components. Alternatively, component (c) can be added to the pre-dispersed clear resin feed which may include the cationic resin (a), the curing agent (b) and/or any other non-pigmented component. Additionally, the silicate material derived from a layered silicate which has been exfoliated with a cationic group-containing polymer (c) can be pre-blended with the pigment paste component prior to the incorporation of the paste to the electrodeposition bath.

The electrocoating composition of the present invention has a resin solids content usually within the range of 5 to 25 percent by weight based on total weight of the electrocoating composition.

As aforementioned, besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between about 0.01 and 25 percent and when used, preferably from about 0.05 to about 5 percent by weight based on total weight of the aqueous medium.

As discussed above, a pigment composition and, if desired, various additives such as surfactants, wetting agents or catalyst can be included in the dispersion. The pigment composition may be of the conventional type comprising pigments, for example, iron oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the invention, when pigment is employed, the pigment-to-resin ratio is usually within the range of about 0.02 to 1:1. The other additives mentioned above are usually in the dispersion in amounts of about 0.01 to 3 percent by weight based on weight of resin solids.

The compositions of the present invention can be applied by electrodeposition to a variety of electroconductive substrates especially metals such as untreated steel, galvanized steel, aluminum, copper, magnesium and conductive carbon coated materials. The applied voltage for electrodeposition may be varied and can be, for example, as low as 1 volt to as high as several thousand volts, but typically between 50 and 500 volts. The current density is usually between 0.5 ampere and 5 amperes per square foot and tends to decrease during electrodeposition indicating the formation of an insulating film.

After the coating has been applied by electrodeposition, it is cured usually by baking at elevated temperatures such as about 90° to about 260° C. for about 1 to about 40 minutes.

Illustrating the invention are the following examples which, however, are not to be considered as limiting the invention to their details. All parts and percentages in the following examples as well as throughout the specification are by weight unless otherwise indicated.

EXAMPLES

Example 1 describes the preparation of a water dispersible epoxy resin for use in the aqueous dispersions of the invention. Example 1-A describes the preparation of a non-pigmented aqueous dispersion of the water dispersible epoxy resin of Example 1. Example 2-A describes the preparation of an aqueous dispersion of the invention which contains a layered silicate material, PGV5 available from Nanocor, Inc. Example 3-A describes the preparation of an aqueous dispersion of a conventional aluminum silicate clay, ASP-200. Example 4-A describes the preparation of an aqueous dispersion of a conventional talc pigment, i.e., magnesium silicate. Comparative Example AA describes the preparation of an electrodeposition bath composition containing the non-pigmented aqueous dispersion of Example 1-A. Examples BB, CC and DD describe the preparation of electrodeposition bath compositions containing the pigmented aqueous dispersions of Example 2-A, 3-A and 4-A, respectively.

Example 1

A water dispersible epoxy resin was prepared from the following ingredients:

| INGREDIENTS | WEIGHT (g) | EQUIVALENTS |
|---|---|---|
| Charge I | | |
| DER 732[1] | 3523.94 | 11.0468 |
| Bisphenol A | 853.62 | 7.4877 |
| Mazon 1651[2] | 43.78 | |
| Charge II | | |
| Benzyldimethylamine | 8.25 | |
| Mazon 1651 | 17.16 | |
| Charge III | | |
| Mazon 1651 | 272.03 | |
| Charge IV | | |
| JEFFAMINE D-400[3] | 924.40 | 4.0673 |
| Mazon 1651 | 43.78 | |
| Charge V | | |
| Epon 880[4] | 112.36 | 0.5082 |
| (85% in Mazon 1651) | | |
| Mazon 1651 | 17.16 | |

[1]Diglycidyl ether of polypropylene glycol (600 molecular weight) commercially available from Dow Chemical Corp.
[2]Butylcarbitol formal commercially available from BASF Corp.
[3]Polypropylene glycol diamine commercially available from Huntsman Chemical Corp.
[4]Diglycidyl ether of Bisphenol A commercially available from Shell Oil and Chemical Co.

Charge I was added to a suitable vessel equipped with a mechanical stirrer, a reflux condenser and a nitrogen inlet and heated to 130° C. under mild agitation. Charge II was then added and the reaction mixture was allowed to exotherm until reaching a temperature of 135° C. That temperature was held for approximately 2 hours until the reaction mixture had an epoxy equivalent weight of 1220 based on resin solids. Charge III and Charge IV were sequentially added to the reaction mixture which cooled to 90° C. and was held at that temperature for a period of 4.5 hours. The reaction mixture had a viscosity of JIK (as determined by a Gardner-Holt bubble viscosity tube with the sample reduced to 50% solids in 1-methoxy-2-propanol). Charge V was then added and the reaction mixture was held for 1.5 hours at 90° C. The epoxy resin thus prepared had a Gardner-Holt bubble viscosity of P.

Example 1-A.

An aqueous dispersion of the epoxy resin of Example 1 was prepared from a mixture of the following ingredients:

| INGREDIENTS | WEIGHT (g) | EQUIVALENTS |
|---|---|---|
| Charge I | | |
| Lactic acid solution | 232.33 | 2.2699 |
| (88% in water) | | |

-continued

| INGREDIENTS | WEIGHT (g) | EQUIVALENTS |
|---|---|---|
| Deionized water | 5513.11 | |
| Charge II | | |
| Epoxy resin of Example 1 | 5409.33 | |
| Charge III | | |
| Deionized water | 3771.21 | |

Charge I was added to a suitable vessel equipped with an agitator. Charge II was added under agitation and the mixture was then stirred for approximately 1.5 hours. Charge III was then added. The resulting dispersion had a theoretical resin solids of 35% and a Brookfield viscosity of 5800 centistokes per second (cps)(spindle #3@12 rpm).

Example 2-A

In accordance with the present invention, an aqueous dispersion of the epoxy resin of Example 2 and a layered silicate material was prepared from a mixture of the following ingredients:

| Ingredients | Weight (g) | Equivalents |
|---|---|---|
| Charge I | | |
| Lactic acid solution (88% in water) | 106.37 | 0.2601 |
| PGV5[1] | 108.79 | |
| Charge II | | |
| Deionized water | 2828.43 | |
| Charge III | | |
| Epoxy resin of Example 1 | 1100.00 | |

[1]Montmorillonite clay material commercially available from Nanocor, Inc.

Charge I was added to a suitable vessel equipped with an agitator. Charge II was heated to boiling and then added under agitation. Charge III was added under agitation and the mixture was stirred for 1.5 hours. X-ray diffraction results indicate that the PGV5 clay is exfoliated in the dispersion with no observable $d_{001}$ diffraction peak.

Example 3-A

An aqueous dispersion of the epoxy resin of Example 1 and a conventional aluminum silicate clay was prepared from a mixture of the following ingredients:

| Ingredients | Weight (g) | Equivalents |
|---|---|---|
| Charge I | | |
| Lactic acid solution (88% in water) | 106.37 | 0.2601 |
| ASP 200[1] | 108.79 | |
| Charge II | | |
| Deionized water | 2828.43 | |
| Charge III | | |
| Epoxy resin of Example 1 | 1100.00 | |

[1]Aluminum silicate commercially available from Englehard Corporation.

Charge I was added to a suitable vessel equipped with an agitator. Charge II was heated to boiling and then added under agitation. Charge III was added under agitation and the mixture was stirred for 1.5 hours.

Example 4-A

An aqueous dispersion of the epoxy resin of Example 1 and a conventional talc, i.e., magnesium silicate, was prepared from a mixture of the following ingredients:

| Ingredients | Weight (g) | Equivalents |
|---|---|---|
| Charge I | | |
| Lactic acid solution (88% in water) | 106.37 | 0.2601 |
| Talc[1] | 108.79 | |
| Charge II | | |
| Deionized water | 2828.43 | |
| Charge III | | |
| Epoxy resin of Example 1 | 1100.00 | |

[1]Magnesium silicate hydrate commercially available as A-5 from Naintsch Mineralwerke GmbH.

Charge I was added to a suitable vessel equipped with an agitator. Charge II was heated to boiling and then added under agitation. Charge III was added under agitation and the mixture was stirred for 1.5 hours.

Example AA

A comparative non-pigmented cationic electrodeposition bath containing the aqueous dispersion of Example 1-A was prepared from the following ingredients:

| INGREDIENTS | PARTS BY WEIGHT |
|---|---|
| Cationic epoxy resin[1] | 694.8 |
| Aqueous dispersion of Example I-A | 101.9 |
| Butyl CARBITOL formal[2] | 11.0 |
| Microgel[3] | 41.3 |
| Catalyst[4] | 13.3 |
| Deionized Water | 1628.5 |

[1]A cationic epoxy based resin with blocked polyisocyanate crosslinker which is generally described as the main vehicle in Example VIIID of U.S. Pat. No. 5,767,191. The resin had a final solids of 44.7%.
[2]Plasticizer which is the reaction product of 2 moles of diethylene glycol butyl ether and 1 mole of formaldehyde, prepared as generally described in U.S. Pat. No. 4,891,111.
[3]A cationic microgel prepared as generally described in Examples A and B of U.S. Pat. No. 5,096,556, with the exception that acetic acid instead of lactic acid was used to disperse the soap of Example A, and EPON 828 solution was added after stripping rather than before in Example B. The resin had a final solids content of 17.9%.
[4]Catalyst paste containing 33% dibutyltin oxide, commercially available from PPG Industries Inc. as E 5269.

The ingredients were added sequentially to a suitable vessel under mild agitation. The final bath solids content was 14.7 weight percent based on total weight of resin solids of the electrodeposition bath.

Example BB

A cationic electrodeposition bath composition containing the aqueous dispersion of Example 2-A was prepared from the following ingredients:

| INGREDIENTS | PARTS BY WEIGHT |
| --- | --- |
| Cationic epoxy resin (as described in Example AA) | 694.8 |
| Aqueous dispersion of Example 2-A | 133.6 |
| Butyl CARBITOL formal | 11.0 |
| Microgel of Example AA | 41.3 |
| Catalyst of Example AA | 13.3 |
| Deionized Water | 596.8 |

The ingredients were added sequentially to a suitable vessel under mild agitation. The bath solids content was 14.7 weight percent based on total weight of solids of the electrodeposition bath. The solids content of PGV5 clay was 0.94% based on total weight of bath solids.

Example CC

A cationic electrodeposition bath composition containing the aqueous dispersion of Example 3-A was prepared from the following ingredients:

| INGREDIENTS | PARTS BY WEIGHT |
| --- | --- |
| Cationic epoxy resin (as described in Example AA} | 694.8 |
| Aqueous dispersion of Example 3-A | 133.6 |
| Butyl CARBITOL formal | 11.0 |
| Microgel of Example AA | 41.3 |
| Catalyst of Example AA | 13.3 |
| Deionized Water | 1596.8 |

The ingredients were added sequentially to a suitable vessel under mild agitation. The final bath solids content was 14.7 weight percent based on total weight of solids in the electrodeposition bath. The solids content of ASP-200 Aluminum silicate was 0.94% based on total weight of bath solids.

Example DD

A cationic electrodeposition bath composition containing the aqueous dispersion of Example 4-A was prepared from the following ingredients:

| INGREDIENTS | PARTS BY WEIGHT |
| --- | --- |
| Cationic epoxy resin (as described in Example AA} | 694.8 |
| Aqueous dispersion of Example 4-A | 133.6 |
| Butyl CARBITOL formal | 11.0 |
| Microgel of Example AA | 41.3 |
| Catalyst of Example AA | 13.3 |
| Deionized Water | 1596.8 |

The ingredients were added sequentially to a suitable vessel under mild agitation. The final bath solids content was 14.7 weight percent based on total weight of solids in the electrodeposition bath. The solids content of magnesium silicate was 0.94% based on total weight of bath solids.

The electrodeposition bath compositions of Examples AA, BB, CC and DD described immediately above were ultrafiltered, thereby removing 20% of the total weight of the bath as ultrafiltrate. The ultrafiltrate was subsequently replaced with deionized water.

Electrocoating Procedure:

Each of the electrocoating bath compositions prepared as described immediately above, were electrodeposited onto cold rolled steel substrate which had been pretreated with zinc phosphate pretreatment followed by a chrome rinse (commercially available as B952/P60 from ACT Laboratories). Bath temperature during the electrocoating process was 90° F. (32.2° C.) and coat-out time was 2 minutes for all bath compositions. Voltage was varied for each composition to achieve a cured film thickness of approximately 0.8 mils. The required voltage for each composition is listed in the following Table 1. After a deionized water rinse, the electrocoated test panels were subsequently cured in an electric oven at 340° F. (171.1° C.) for 30 minutes.

Testing Procedures:

The cured electrocoat films were evaluated for film smoothness, crater count, and oil spot resistance. Film thickness was measured using a Fischer Permascope. Recorded film thickness is based on an average of four measurements. Film smoothness was measured using a Taylor-Hobson Surtronic 3+ profilometer. Recorded film smoothness is the average of three measurements. Results for both film thickness and film smoothness are reported in the following Table 1.

Crater count evaluates the resistance of coatings to cratering which can result from coating processing conditions. The front side of a four inch by six inch coated and cured B952/P60 test panels were visually inspected for the presence of craters. Results reported in the following Table I represent the actual number of craters observed upon inspection.

Oil spot contamination resistance testing evaluates the ability of an electrodeposited coating, upon cure, to resist crater formation due to contaminants carried into the bath with the substrate as discussed above. Panels were tested for oil spot resistance by spotting the top one-half of a B952/P60 test panel with TRIBOL-ICO medium oil and the bottom one-half with LUBECON ATS oil. These oils are representative of those typically used for chain lubrication in automotive assembly plants. The oil-spotted test panels were then electrocoated and cured as described above to give a cured film thickness of approximately 0.8 mils. Ratings for oil spot contamination resistance are reported in the following Table 1.

TABLE 1

| Example | Description | Voltage/Film Build | Smoothness ($\mu$ inches) | Crater Count | Oil Spot* |
| --- | --- | --- | --- | --- | --- |
| AA | Comparative | 200 V./.82 mil | 6–7 | 56 | 1 |
| BB | PGV5 | 180 V/.85 mil | 4–5 | 5 | 3–4 |
| CC | ASP 200 | 190 V/.81 mil | 6 | 51 | 1 |
| DD | A-5 talc | 140 V/.83 mil | 4 | 60 | 1 |

*10 = best; 0 = worst

The results in Table 1 illustrate that electrodeposition bath compositions containing the PGV5 clay exhibit improved crater count and oil spot contamination resistance versus the non-pigmented comparative composition and the compositions containing conventional aluminum silicate clay (ASP-200) or magnesium silicate (A-5 talc). Additionally, film smoothness was not adversely affected by the addition of the PGV5 clay at the level tested.

We claim:

1. A cationic electrodepositable composition comprising an acidified aqueous dispersion of the following components:

(a) an ungelled cationic resin;

(b) a curing agent having at least two functional groups which are reactive with (a); and (c) an exfoliated silicate derived from a layered silicate.

2. The composition of claim 1 wherein the layered silicate has been exfoliated with a cationic group-containing polymer or a polymer having functional groups which can be post-reacted to form cationic groups.

3. The composition of claim 2 wherein the layered silicate has been exfoliated with an amino group-containing polymer.

4. The composition of claim 2 wherein the cationic group-containing polymer or polymer having functional groups which can be post-reacted to form cationic groups has a weight average molecular weight of 500 to 50,000.

5. The composition of claim 4 wherein the cationic group-containing polymer or polymer having functional groups which can be post-reacted to form cationic groups contains 0.4 milliequivalents/gram to 5.0 milliequivalents/gram of base.

6. The composition of claim 2 wherein the solid content of component (c) in the composition is from 5 weight percent to 50 weight percent based on total solid content of the composition, and wherein the weight ratio of the exfoliated silicate to the cationic group-containing polymer or polymer containing functional groups which can be post-reacted to form cationic groups is 0.05 to 0.5:1.

7. The composition of claim 1 wherein the cationic resin (a) contains active hydrogen groups.

8. The composition of claim 1 wherein the curing agent (b) is a polyisocyanate.

9. The composition of claim 1 wherein the layered silicate has an aspect ratio of 200 to 2,000.

10. The composition of claim 1 wherein the layered silicate is a montmorillonite clay.

11. The composition of claim 1 in which the layered silicate has been pretreated with an acid prior to exfoliation.

12. The composition of claim 11 wherein the exfoliated silicate of component (c), has been further treated with an acid after exfoliation.

13. The composition of claim 12 wherein the exfoliated silicate of component (c), has been further treated with an acid selected from the group consisting of sulfamic acid, lactic acid, acetic acid, oxalic acid and formic acid.

14. A method of electrocoating a conductive substrate serving as a cathode in an electrical circuit comprising said cathode and an anode, said cathode and anode being immersed in an aqueous electrocoating composition, comprising passing electric current between said cathode and anode to cause deposition of the electrocoating composition on the substrate as a substantially continuous film, the electrocoating composition comprising an acidified dispersion of the following components:

(a) an ungelled active hydrogen group-containing cationic resin;

(b) a curing agent having at least two functional groups which are reactive with the active hydrogen groups of (a); and (c) an exfoliated silicate derived from a layered silicate.

15. The method of claim 14 wherein the layered silicate has been exfoliated with a cationic group-containing polymer or polymer having functional groups which are post-reacted to form cationic groups.

16. The method of claim 15 wherein the cationic group-containing polymer or polymer having functional groups which can be post-reacted to form cationic groups has a weight average molecular weight of 500 to 50,000.

17. The method of claim 16 wherein the cationic group-containing polymer or polymer having functional groups which can be post-reacted to form cationic groups contains 0.4 milliequivalents/gram to 5.0 milliequivalents/gram of base.

18. The method of claim 15 wherein the solids content of component (c) in the electrocoating composition is from 1 weight percent to 20 weight percent, based on total solid content of the electrocoating composition, and wherein the weight ratio of the exfoliated silicate to the cationic group-containing polymer or polymer having functional groups which can be post-reacted to form cationic groups is 0.05 to 0.5:1.

19. The method of claim 14 wherein the layered silicate has been pretreated with an acid prior to exfoliation.

20. The method of claim 19 wherein the exfoliated silicate has been further treated with an acid after exfoliation.

21. The method of claim 20 wherein the exfoliated silicate has been further treated with an acid selected from the group consisting of sulfamic acid, lactic acid, acetic acid, oxalic acid and formic acid.

22. The method of claim 14 wherein the layered silicate has an aspect ratio of 200 to 2,000.

23. The method of claim 14 wherein the layered silicate is a montmorillonite clay.

24. The method of claim 14 wherein the layered silicate has been exfoliated with an amino group-containing polymer.

25. The method of claim 14 wherein the curing agent (b) is a polyisocyanate.

* * * * *